(12) United States Patent
Cellura et al.

(10) Patent No.: US 9,114,789 B2
(45) Date of Patent: Aug. 25, 2015

(54) FOOT BRAKE VALVE APPARATUS FOR A HEAVY VEHICLE BRAKING SYSTEM

(71) Applicant: Bendix Commercial Vehicle Systems LLC, Elyria, OH (US)

(72) Inventors: Daniel J. Cellura, Brunswick, OH (US); Christopher L. Brubaker, Lakewood, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 106 days.

(21) Appl. No.: 14/011,141

(22) Filed: Aug. 27, 2013

(65) Prior Publication Data

US 2015/0061367 A1     Mar. 5, 2015

(51) Int. Cl.
| | | |
|---|---|---|
| *B60T 7/06* | (2006.01) | |
| *B60T 11/28* | (2006.01) | |
| *B60T 15/04* | (2006.01) | |

(52) U.S. Cl.
CPC .................................... *B60T 15/043* (2013.01)

(58) Field of Classification Search
CPC ..... B60T 15/043; B60T 15/048; B60T 15/02; B60T 13/36; B60T 8/00
USPC ...................................................... 303/50, 20
See application file for complete search history.

(56) References Cited

U.S. PATENT DOCUMENTS

| | | | |
|---|---|---|---|
| 3,355,223 A | 11/1967 | Klimek | |
| 3,359,043 A | 12/1967 | Papin | |
| 3,390,920 A * | 7/1968 | Dobrikin | 303/52 |
| 3,449,020 A * | 6/1969 | Klimek | 303/54 |
| 4,679,594 A | 7/1987 | Fogg | |
| 4,729,607 A | 3/1988 | Johnson | |
| 4,861,115 A | 8/1989 | Petersen | |
| 6,312,061 B1 * | 11/2001 | Schliebe et al. | 303/20 |
| 6,659,244 B2 | 12/2003 | Goodell | |
| 2006/0017317 A1 * | 1/2006 | Howell et al. | 303/7 |

FOREIGN PATENT DOCUMENTS

| | | | |
|---|---|---|---|
| CN | 202728203 | * | 2/2013 |
| DE | 102010007410 | * | 6/2011 |

OTHER PUBLICATIONS

Bendix Commercial Vehicle Systems LLC, The Air Brake Handbook, catalog, Feb. 2009, 65 pages, Bendix Commercial Vehicle Systems LLC, Elyria Ohio, United States.
PCT International Search Report and Written Opinion, International Application No. PCT/US2014/049325, Nov. 19, 2014, 10 pages, ISA/US, United States.
Bendix E-8P & E-10P Dual Brake Valve Service Data Sheet, Aug. 2007, Bendix Commercial Vehicle Systems LLC, Elyria OH, US.

* cited by examiner

*Primary Examiner* — Anna Momper
*Assistant Examiner* — San Aung
(74) *Attorney, Agent, or Firm* — Cheryl L. Greenly; Eugene E. Clair; Brian E. Kondas

(57) ABSTRACT

A foot brake valve apparatus is provided for a heavy vehicle braking system. The foot brake valve apparatus comprises a valve body having a first side face and a second side face opposite the first side face. The apparatus further comprises a primary supply pressure port associated with a primary braking circuit and adjoining the first side face, and a primary delivery pressure port associated with the primary braking circuit and adjoining the first side face. The apparatus also comprises a secondary supply pressure port associated with a secondary braking circuit and adjoining the first side face, and a secondary delivery pressure port associated with the secondary braking circuit and adjoining the first side face.

6 Claims, 5 Drawing Sheets

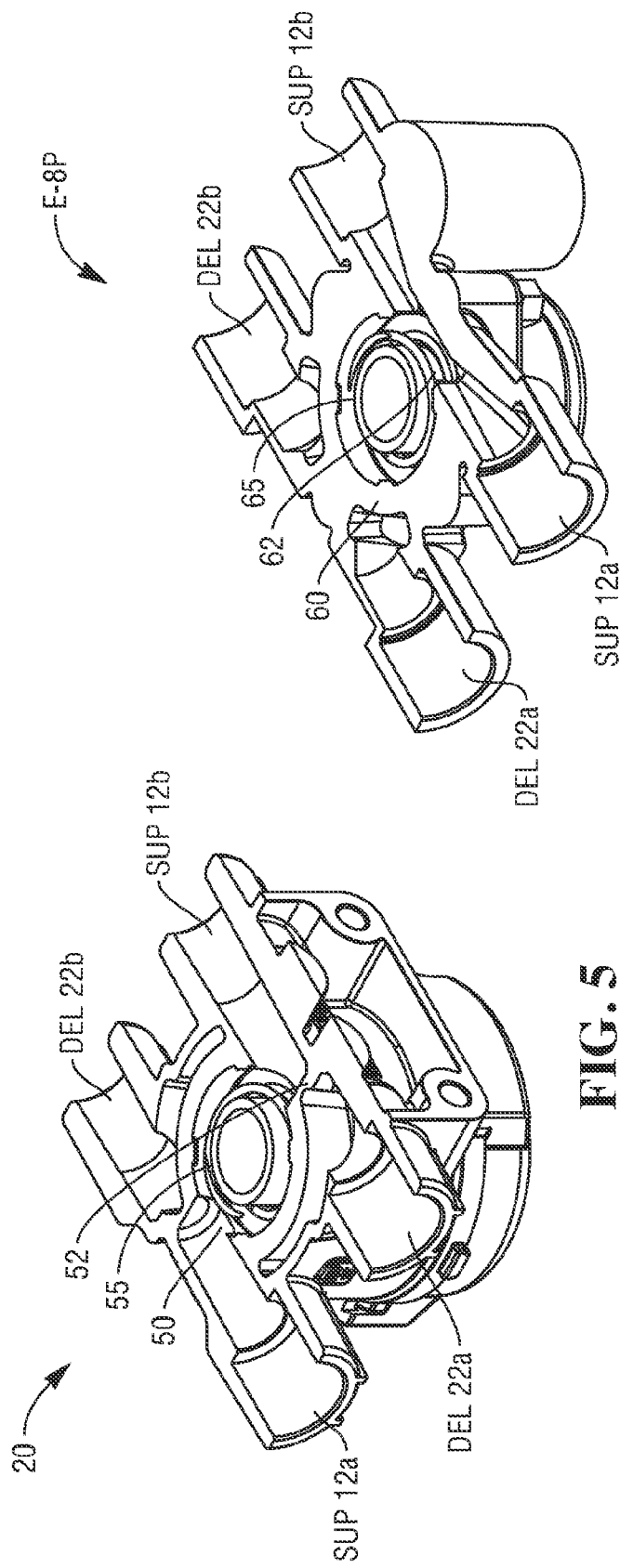

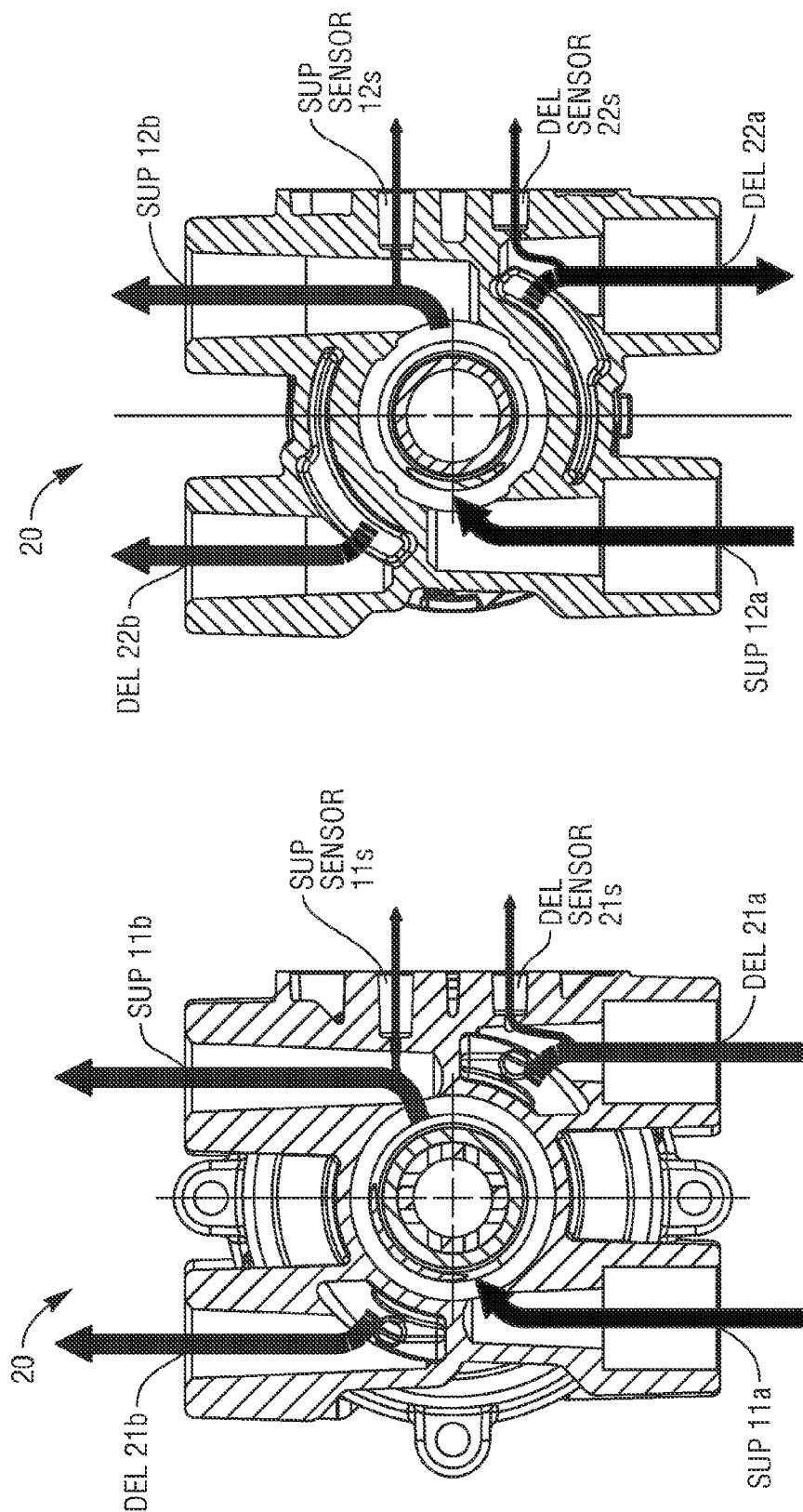

FOOT BRAKE VALVE APPARATUS FOR A HEAVY VEHICLE BRAKING SYSTEM

BACKGROUND

The present application relates to heavy vehicle braking systems, and is particularly directed to a foot brake valve apparatus for a heavy vehicle braking system, such as a truck braking system.

One type of foot brake valve apparatus includes a foot brake valve having a valve body and parallel supply pressure ports on one side of the valve body and delivery pressure ports on an opposite side of the valve body. A primary supply pressure port and a primary delivery pressure port are provided for a primary braking circuit. A secondary supply pressure port and a secondary delivery pressure port are provided for a secondary braking circuit. The primary and secondary supply pressure ports are on the one side of the valve body, and the primary and secondary delivery pressure ports are on the opposite side of the valve body. A drawback in this known type of foot brake valve apparatus is that a single pressure sensing package is unable to be installed on the valve body to access the four different pressure ports to measure pressure at each of the four pressure ports. It would be desirable to provide a foot brake valve apparatus in which a single pressure sensing package can be installed on the valve body to access all four pressure ports so that pressure measurements can be obtained at each of the pressure ports.

SUMMARY

In accordance with one embodiment, a foot brake valve apparatus is provided for a heavy vehicle braking system. The foot brake valve apparatus comprises a valve body having a first side face and a second side face opposite the first side face. The apparatus further comprises a primary supply pressure port associated with a primary braking circuit and adjoining the first side face, and a primary delivery pressure port associated with the primary braking circuit and adjoining the first side face. The apparatus also comprises a secondary supply pressure port associated with a secondary braking circuit and adjoining the first side face, and a secondary delivery pressure port associated with the secondary braking circuit and adjoining the first side face.

In accordance with another embodiment, a foot brake valve apparatus is provided for a heavy vehicle braking system. The foot brake valve apparatus comprises a valve body having a plurality of supply pressure ports and a corresponding number of a plurality of delivery pressure ports associated therewith. The apparatus further comprises means for providing internal air passages interconnecting the plurality of supply pressure ports and the plurality of delivery pressure ports to locate all of the pressure ports adjoining a single sensor port side face of the valve body.

In accordance with yet another embodiment, a foot brake valve apparatus is provided for a heavy vehicle braking system. The foot brake valve apparatus comprises a valve body having a single sensor port side face on which primary and secondary supply pressure sensor ports and primary and secondary delivery pressure sensor ports are accessed. The apparatus further comprises a single pressure sensor package disposed on the single sensor port side face and pneumatically coupled to the primary and secondary supply pressure sensor ports and the primary and secondary delivery pressure sensor ports to allow pressure to be measured at each of the pressure sensor ports.

BRIEF DESCRIPTION OF THE DRAWINGS

FIG. 5 is a cutaway view, taken approximately along line 5-5 shown in FIG. 1, and showing internal air passages in a secondary braking circuit portion of the foot brake valve shown in FIG. 3.

FIG. 6 is a cutaway view similar to the cutaway view of FIG. 5, and showing internal air passages in a secondary braking circuit portion of the known foot brake valve shown in FIG. 4.

FIG. 7 is a sectional view which corresponds to the cutaway view of FIG. 3, and showing directions of air flow in the internal air passages in the primary braking circuit portion of the foot brake valve.

FIG. 8 is a sectional view which corresponds to the cutaway view of FIG. 5, and showing directions of air flow in the internal air passages in the secondary braking circuit portion of the foot brake valve.

DETAILED DESCRIPTION

Figure 1:
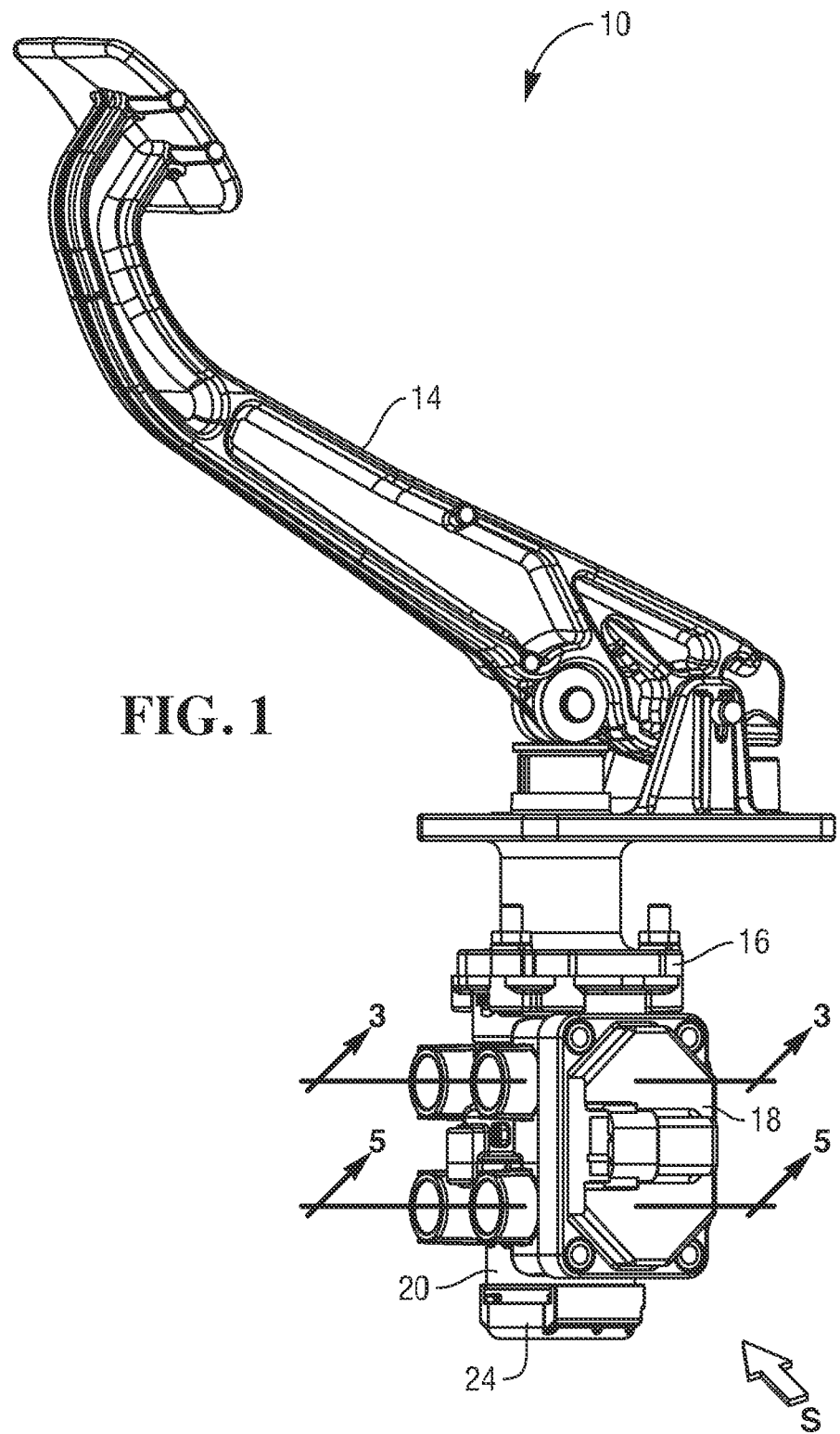
FIG. 1 is a perspective view of a foot brake valve apparatus constructed in accordance with one embodiment.

Referring to FIG. 1, apparatus 10 is provided for use in a heavy vehicle such as a truck. Apparatus 10 is constructed in accordance with one embodiment.

Brake pedal 14 has a treadle operatively coupled through mounting plate 16 to foot brake valve 20 in known manner. Pedal 14 may comprise any type of commercially available brake pedal. When the vehicle driver desires to apply service brakes of the vehicle, the vehicle driver applies a foot to pedal 14 to move a plunger (not shown) within valve 20. Travel movement of the plunger closes exhaust port 24 and opens passages within valve 20 to allow air pressure waiting there to pass through and be delivered to front and rear braking systems to apply service brakes of the vehicle to slow and stop the vehicle.

When the vehicle driver's foot is removed from pedal 14, internal return springs within valve 20 move to their original positions. This allows air in valve 20 and delivery lines to vent to atmosphere through the exhaust port 24. Structure and operation of brake pedals and foot brake valves to slow and stop a vehicle are known and, therefore, will not be described.

A single pressure sensing package 18 includes a plurality of pressure sensors which are pneumatically coupled to valve 20, as will be described hereinbelow. Pressure sensing package 18 may be modular.

Figure 2:
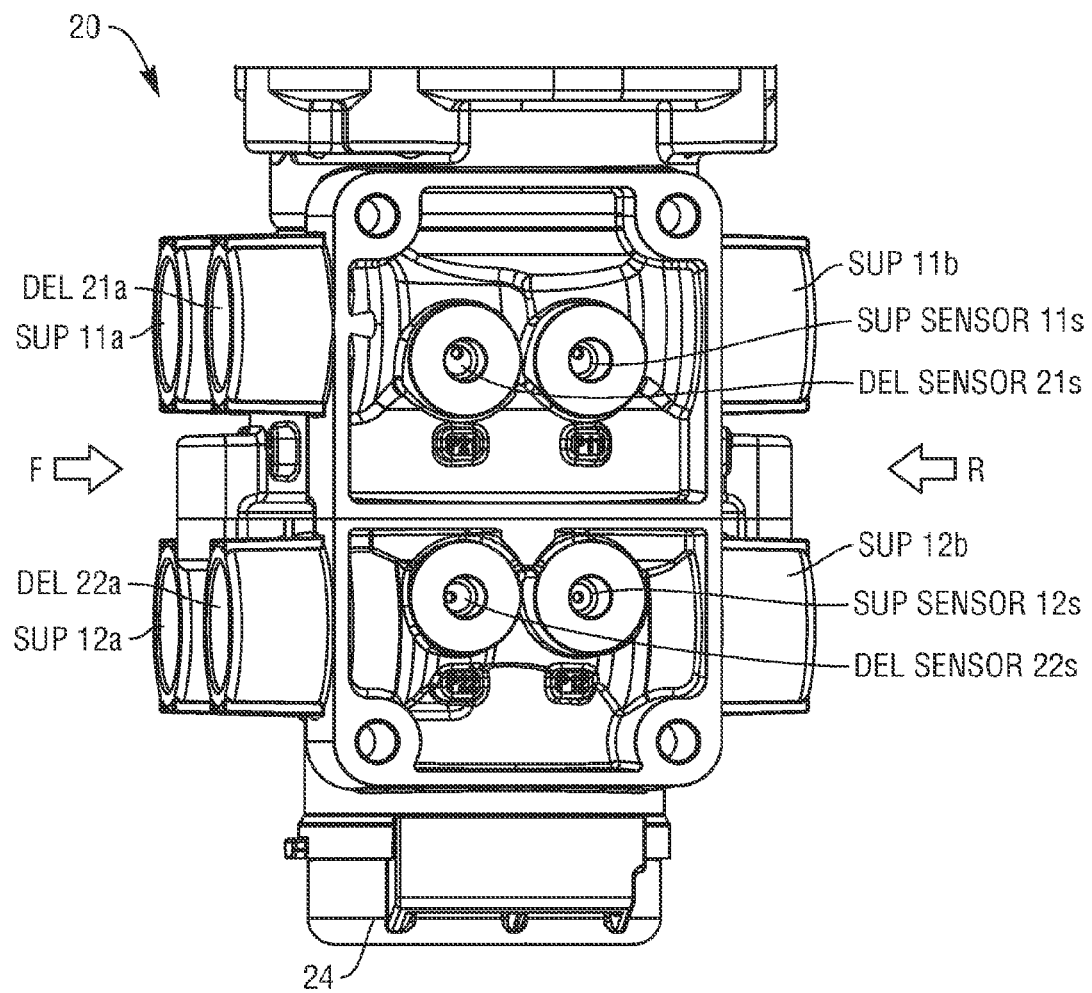
FIG. 2 is an enlarged perspective view of a portion of FIG. 1, looking approximately in the direction of arrow "S" shown in FIG. 1 with a pressure sensing package removed.

Referring to FIG. 2, an enlarged perspective view of a portion of FIG. 1, looking approximately in the direction of arrow "S" shown in FIG. 1, is illustrated with the single pressure sensing package 18 removed. Valve 20 has eight pressure ports and four pressure sensor ports. Four of the eight pressure ports are disposed in a plane which lies on a front face (looking approximately in the direction of arrow "F" shown in FIG. 2) of valve 20. The other four of the eight pressure ports are disposed in a plane which lies on a rear face (looking approximately in the direction of arrow "R" shown in FIG. 2) of valve 20.

The four pressure sensor ports are disposed in a plane which is parallel with a plane on which a single sensor port side face (looking into the page of FIG. 2 and corresponding to the direction of arrow "S" shown in FIG. 1) of valve 20 lies. The plane on which the single sensor port side face lies extends transversely between the plane on which the front face of valve 20 lies and the plane on which the rear face of valve 20 lies.

Figure 3:
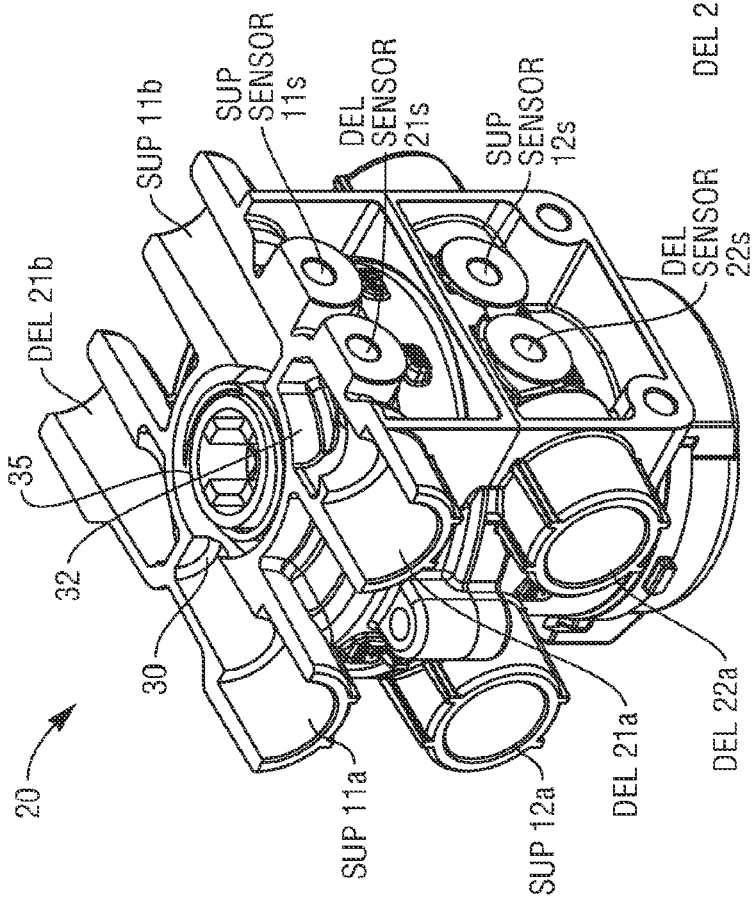
FIG. 3 is a cutaway view, taken approximately along line 3-3 shown in FIG. 1, and showing internal air passages in a primary braking circuit portion of a foot brake valve.

As shown in FIG. 2, primary supply pressure port "SUP 11a" is connected in fluid communication through internal air passages of valve 20 to primary supply pressure port "SUP 11b", and primary delivery pressure port "DEL 21a" is connected in fluid communication through internal air passages of valve 20 to primary delivery pressure port "DEL 21b" (not visible in FIG. 2 but is visible in the cutaway view of FIG. 3). Primary supply sensor port "SUP SENSOR 11s" is pneumatically coupled and plumbed into primary supply pressure port "SUP 11b", and primary delivery sensor port "DEL SENSOR 21s" is pneumatically coupled and plumbed into primary delivery pressure port "DEL 21a".

For simplicity, primary supply pressure port "SUP 11a" will be referred to as "port 11a", primary supply pressure port "SUP 11b" will be referred to as "port 11b", primary delivery pressure port "DEL 21a" will be referred to as "port 21a", primary delivery pressure port "DEL 21b" will be referred to as "port 21b", primary supply sensor port "SUP SENSOR 11s" will be referred to as "sensor port 11s", and primary delivery sensor port "DEL SENSOR 21s" will be referred to as "sensor port 21s". Ports 11a, 11b, 21a, 21b and sensor ports 11s, 21s are associated with a primary braking circuit portion of the valve 20.

Similarly, secondary supply pressure port "SUP 12a" is connected in fluid communication through internal air passages of valve 20 to secondary supply pressure port "SUP 12b", and secondary delivery pressure port "DEL 22a" is connected in fluid communication through internal air passages of valve 20 to secondary delivery pressure port "DEL 22b" (not visible in FIG. 2 but is visible in the cutaway view of FIG. 5). Secondary supply sensor port "SUP SENSOR 12s" is pneumatically coupled and plumbed into secondary supply pressure port "SUP 12b", and secondary delivery sensor port "DEL SENSOR 22s" is pneumatically coupled and plumbed into secondary delivery pressure port "DEL 22a".

For simplicity, secondary supply pressure port "SUP 12a" will be referred to as "port 12a", secondary supply pressure port "SUP 12b" will be referred to as "port 12b", secondary delivery pressure port "DEL 22a" will be referred to as "port 22a", secondary delivery pressure port "DEL 22b" will be referred to as "port 22b", secondary supply sensor port "SUP SENSOR 12s" will be referred to as "sensor port 12s", and secondary delivery sensor port "DEL SENSOR 22s" will be referred to as "sensor port 22s". Ports 12a, 12b, 22a, 22b and sensor ports 12s, 22s are associated with a secondary braking circuit portion of the valve 20.

Referring to FIG. 3, a cutaway view is taken approximately along line 3-3 shown in FIG. 1. FIG. 3 shows the four sensor ports 11s, 21s, 12s, 22s, and only six of eight of the ports 11a, 11b, 21a, 21b, 12a, 12b, 22a, 22b. Port 12b and port 22b are not visible in FIG. 3 but are visible in the cutaway view of FIG. 5.

FIG. 3 also shows internal air passages in the primary braking circuit portion of valve 20. The internal air passages shown in primary braking circuit portion of valve 20 in FIG. 3 are modified internal air passages of primary braking circuit portion of commercially available E-8P® Dual Brake Valve (shown in FIG. 4) from Bendix Commercial Vehicle Systems LLC located in Elyria, Ohio. The E-8P Dual Brake Valve is designated with reference numeral "E-8P" in FIG. 4, and will be referred to herein as "valve E-8P".

Figure 4:
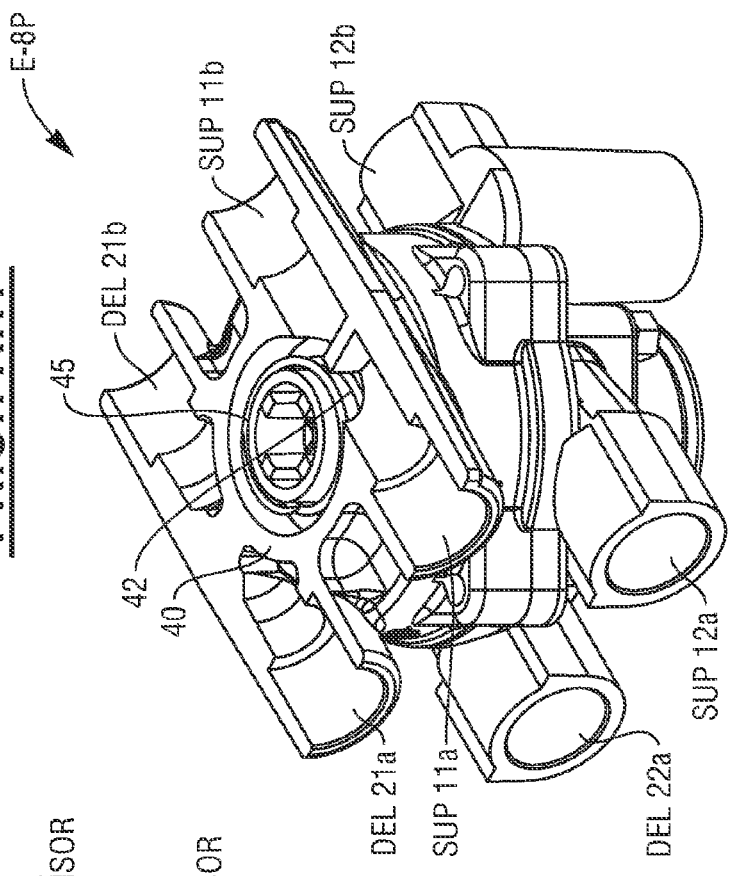
FIG. 4 is a cutaway view similar to the cutaway view of FIG. 3, and showing internal air passages in a primary braking circuit portion of a known foot brake valve.

More specifically, valve E-8P is modified at two locations in the primary braking circuit portion of valve E-8P shown in FIG. 4 to provide the primary braking circuit portion of valve 20 shown in FIG. 3. One modification is removing wall portion 40 in FIG. 4 to provide passage opening 30 in FIG. 3. Wall portion 40 blocks fluid communication between port 21a and central chamber 45 in FIG. 4, whereas passage opening 30 allows fluid communication between port 11a and central chamber 35 in FIG. 3. Central chamber 35 is in fluid communication with port 11b in FIG. 3. Thus, this modification allows fluid communication to be established between port 11a and port 11b shown in FIG. 3.

The other modification is blocking passage opening 42 in FIG. 4 by putting in wall portion 32 in FIG. 3. Passage opening 42 allows fluid communication between port 11a and central chamber 45 in FIG. 4, whereas wall portion 32 blocks fluid communication between port 21a and central chamber 35 in FIG. 3. By blocking fluid communication between port 21a and central chamber 35 shown in FIG. 3, fluid communication is established through another chamber (not shown in FIG. 3) between delivery ports 21a and 21b and supply ports 11a and 11b when plunger of valve 20 is moved in response to the vehicle driver's foot moving pedal 14.

Except for the two modifications as just described, the remaining internal air passages associated with the primary braking circuit portion of valve 20 shown in FIG. 3 are the same as the remaining internal air passages associated with the primary braking circuit portion of valve E-8P shown in FIG. 4.

Referring to FIG. 5, a cutaway view is taken approximately along line 5-5 shown in FIG. 1. FIG. 5 shows only four of eight of the ports 11a, 11b, 21a, 21b, 12a, 12b, 22a, 22b. Ports 11a, 11b, 21a, 21b are not visible in FIG. 5.

FIG. 5 also shows internal air passages in the secondary braking circuit portion of valve 20. The internal air passages shown in secondary braking circuit portion of valve 20 in FIG. 5 are modified internal air passages of secondary braking circuit portion of valve E-8P shown in FIG. 6 which is the same valve E-8P shown in FIG. 4.

More specifically, valve E-8P is modified at two locations in the secondary braking circuit portion of valve E-8P shown in FIG. 6 to provide the secondary breaking circuit portion of valve 20 shown in FIG. 5. One modification is removing wall portion 60 in FIG. 6 to provide passage opening 50 in FIG. 5. Wall portion 60 blocks fluid communication between port 22a and central chamber 65 in FIG. 6, whereas passage opening 50 allows fluid communication between port 12a and central chamber 55 in FIG. 5. Central chamber 55 is in fluid communication with port 12b in FIG. 5. Thus, this modification allows fluid communication to be established between port 12a and port 12b in FIG. 5.

The other modification is blocking passage opening 62 in FIG. 6 by putting in wall portion 52 in FIG. 5. Passage opening 62 allows fluid communication between port 12a and central chamber 65 in FIG. 6, whereas wall portion 52 blocks fluid communication between port 22a and central chamber 55 in FIG. 5. By blocking fluid communication between port 22a and central chamber 55 shown in FIG. 5, fluid communication is established through another chamber (not shown in FIG. 5) between delivery ports 22a and 22b and supply ports 12a and 12b when plunger of valve 20 is moved in response to the vehicle driver's foot moving pedal 14.

Except for the two modifications as just described, the remaining internal air passages associated with the secondary braking circuit portion of valve 20 shown in FIG. 5 are the same as the remaining internal air passages associated with the secondary braking circuit portion of valve E-8P shown in FIG. 6.

After the above-described modifications are made to valve E-8P shown in FIGS. 4 and 6 to provide modified valve 20 shown in FIGS. 3 and 5, internal air passages in both the primary braking circuit portion and the secondary braking circuit portion of valve E-8P are rerouted to provide different flow patterns in both the primary braking circuit portion and the secondary braking circuit portion of modified valve 20. The different airflows in the modified valve 20 are such that the eight ports 11a, 11b, 21a, 21b, 12a, 12b, 22a, 22b are defined at their locations shown in FIGS. 3 and 5. More specifically, the four ports 21a, 22a, 11b, 12b are located on one side of modified valve 20, and the four ports 11a, 12a, 21b, 22b are located on opposite side of modified valve 20.

Referring to FIG. 7, the different directions of air flow in the internal air passages of the primary braking circuit portion of modified valve 20 of FIG. 3 are illustrated. Similarly, referring to FIG. 8, the different directions of air flow in the internal air passages of the secondary braking circuit portion of modified valve 20 of FIG. 5 are illustrated. As can be seen in FIGS. 7 and 8, air flows in a somewhat crossing circuit pattern in each of the primary and secondary braking circuit portions of valve 20.

More specifically, the crossing circuit pattern of the primary braking circuit portion of valve 20 shown in FIG. 7 is arranged such that (i) the primary supply pressure port 11a on the front face of valve 20 and the primary supply pressure port 11b on the rear face of valve 20 are diagonally opposed to each other relative to the body of valve 20, and (ii) the primary delivery pressure port 21 a on the front face of valve 20 and the primary delivery pressure port 21b on the rear face of valve 20 are diagonally opposed to each other relative to the body of valve 20.

Similarly, the crossing circuit pattern of the secondary braking circuit portion of valve 20 shown in FIG. 8 is arranged such that (i) the secondary supply pressure port 12a on the front face of valve 20 and the secondary supply pressure port 12b on the rear face of valve 20 are diagonally opposed to each other relative to the body of valve 20, and (ii) the secondary delivery pressure port 22a on the front face of valve 20 and the secondary delivery pressure port 22b on the rear face of valve 20 are diagonally opposed to each other relative to the body of valve 20.

Also, as can be seen in FIGS. 7 and 8, the crossing air flow pattern in each of the primary and secondary braking circuit portions of valve 20 allows all four sensor ports 11s, 21s, 12s, 22s to be pneumatically coupled and plumbed on only the single sensor port side face of valve 20.

It should be apparent that port locations of a commercially available foot brake valve (i.e., the valve E-8P in the above-described example) have been modified without affecting the pneumatic function of the valve. More specifically, supply port locations and delivery port locations of valve E-8P have been altered to facilitate installation of the single, modular pressure sensing package 18 to measure pressure at both the primary supply and delivery ports of the primary braking circuit and both the secondary supply and delivery ports of the secondary braking circuit. This is achieved without having to increase the length of valve E-8P, and without having to add outer passages to valve E-8P.

A number of advantages result by providing a modified commercially available foot brake valve in accordance with the above-described description. One advantage is that only a single pressure sensing package (containing four pressure sensors) is needed to measure pressures at both the primary supply and delivery ports of the primary braking circuit and both the secondary supply and delivery ports of the secondary braking circuit.

Another advantage is that only a single wiring harness is needed to connect between the single pressure sensing package 18 and an electronic controller (not shown). The result is harness simplification, improved serviceability, and reduced installation (labor) costs.

Although the above-description describes valve E-8P being modified to provide four pressure sensor ports on a single side face of the valve, it is conceivable that other commercially available foot brake valves may be modified to accomplish the same. Moreover, it is conceivable that new foot brake valves may be designed to provide four pressure sensor ports on a single side face. It is also conceivable that commercially available foot brake valves may be modified or new foot brake valves be designed to provide a number of pressure sensor ports which is other four. As an example, a modified foot brake valve or a newly designed foot brake valve may have only three pressure sensor ports. As another example, a modified or newly designed foot brake valve may have six sensor pressure ports.

Also, although the brake pedal 14 shown in FIG. 1 is of a suspended type, it is conceivable that another type of brake pedal, such as a floor-mounted type of brake pedal may be used.

Further, although the above-description describes apparatus 10 being used in a heavy vehicle such as a truck, it is conceivable that apparatus 10 may be used in other types of heavy vehicles, such as busses for example.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A foot brake valve apparatus for a heavy vehicle braking system, the foot brake valve apparatus comprising: a valve body having a first side face and a second side face opposite the first side face; a first primary supply pressure port associated with a primary braking circuit and adjoining the first side face; a first primary delivery pressure port associated with the primary braking circuit and adjoining the first side face; a first secondary supply pressure port associated with a secondary braking circuit and adjoining the first side face; a first secondary delivery pressure port associated with the secondary braking circuit and adjoining the first side face; a second primary supply pressure port adjoining the second side face, wherein the first and second primary supply pressure ports are diagonally opposed to each other relative to the valve body; a second primary delivery pressure port adjoining the second side face, wherein the first and second primary delivery pressure ports are diagonally opposed to each other relative to the valve body; a second secondary supply pressure port adjoining the second side face, wherein the first and second secondary supply pressure ports are diagonally opposed to each other relative to the valve body; a second secondary delivery pressure port adjoining the second side face, wherein the first and second secondary delivery pressure ports are diagonally opposed to each other relative to the valve body; a primary supply sensor port disposed on a single sensor port side face and pneumatically coupled to the first and second primary supply pressure ports; a primary delivery sensor port disposed on the single sensor port side face and pneumatically coupled to the first and second primary delivery pressure ports; a secondary supply sensor port disposed on the single sensor port side face and pneumatically coupled to the first and second secondary supply pressure ports; and a secondary delivery sensor port disposed on the single sensor port side face and pneumatically coupled to the first and second secondary delivery pressure ports.

2. A foot brake valve apparatus according to claim 1, wherein all of the sensor ports lie in a plane which is transverse with a plane in which the first side face lies.

3. A foot brake valve apparatus according to claim 2, further comprising (i) a mounting plate disposed on top of the valve body, and (ii) a treadle disposed on top of the mounting plate.

4. A foot brake valve apparatus according to claim 1, further comprising a single pressure sensor package including four pressure sensors which are installed on the single sensor port side face.

5. A foot brake valve apparatus according to claim 4, wherein (i) a first one of the four pressure sensors is pneumatically coupled through the primary supply sensor port on the single sensor port side face to the first and second primary supply pressure ports, (ii) a second one of the four pressure sensors is pneumatically coupled through the primary delivery sensor port on the single sensor port side face to the first and second primary delivery pressure ports, (iii) a third one of the four pressure sensors is pneumatically coupled through the secondary supply sensor port on the single sensor port side face to the first and second secondary supply pressure ports, and (iv) a fourth one of the four pressure sensors is pneumatically coupled through the secondary delivery sensor port on the single sensor port side face to the first and second secondary delivery pressure ports.

6. A foot brake valve apparatus according to claim 5, further comprising (i) a mounting plate disposed on top of the valve body, and (ii) a treadle disposed on top of the mounting plate.

* * * * *